United States Patent
Tokita et al.

(10) Patent No.: US 7,154,827 B2
(45) Date of Patent: Dec. 26, 2006

(54) OPTICAL DISK APPARATUS

(75) Inventors: Yuhi Tokita, Kawaguchi (JP); Naoto Takeda, Tokyo (JP)

(73) Assignee: TEAC Corporation, Musashino (JP)

(*) Notice: Subject to any disclaimer, the term of this patent is extended or adjusted under 35 U.S.C. 154(b) by 500 days.

(21) Appl. No.: 10/617,542

(22) Filed: Jul. 10, 2003

(65) Prior Publication Data

US 2004/0008594 A1    Jan. 15, 2004

(30) Foreign Application Priority Data

Jul. 10, 2002    (JP)    .............................. 2002-201588

(51) Int. Cl.
*G11B 5/09* (2006.01)
(52) U.S. Cl. ................. 369/47.53; 369/53.34
(58) Field of Classification Search .................... None
See application file for complete search history.

(56) References Cited

U.S. PATENT DOCUMENTS

| 5,905,695 | A | * | 5/1999 | Kimura | .................. | 369/13.24 |
| 6,115,338 | A | * | 9/2000 | Masaki et al. | ........... | 369/47.52 |
| 6,463,020 | B1 | * | 10/2002 | Minemura et al. | ....... | 369/47.53 |
| 6,778,478 | B1 | * | 8/2004 | Mashimo et al. | ........ | 369/47.53 |
| 2002/0036962 | A1 | * | 3/2002 | Masaki et al. | ........... | 369/47.53 |

FOREIGN PATENT DOCUMENTS

| JP | 11-25491 A |   | 1/1999 |
| JP | 11025491 A | * | 1/1999 |
| JP | 2001-351249 A |   | 12/2001 |

* cited by examiner

*Primary Examiner*—William Korzuch
*Assistant Examiner*—Tawfik Goma
(74) *Attorney, Agent, or Firm*—Christensen O'Connor Johnson Kindness PLLC

(57) ABSTRACT

An optical disk apparatus for recording data on an optical disk. Prior to recording data on the optical disk, a controller records test data in a test area of the optical disk, thereby optimizing write power. After having recorded the test data, the controller computes a difference between jitter or an error rate obtained when test data are overwritten at write power higher than that used for recording test data and jitter or an error rate obtained when test data are overwritten at write power lower than that used for recording the test data. A jitter or error rate difference is detected while write power is changed. Write power at which the jitter or error rate difference is smaller than or equal to a predetermined threshold value is selected as optimum write power, and data are recorded in a data area.

9 Claims, 8 Drawing Sheets

OPTICAL DISK APPARATUS

BACKGROUND OF THE INVENTION

1. Field of the Invention

The present invention relates to an optical disk apparatus, and more particularly, to optimization of write power.

2. Description of the Related Art

An optical disk apparatus for recording data on a rewritable optical disk, such as a CD-RW, DVD-RW, or DVD-RAM, has already been developed. The optical disk apparatus records data after having optimized write power. The followings are steps for optimizing write power.

(1) The optical disk apparatus records test data in a predetermined area [test area: PCA (Power Calibration Area)] of an optical disk.

(2) The optical disk apparatus overwrites test data at the same location by changing write power in a plurality of levels.

(3) The optical disk apparatus reproduces the test data after overwriting, to thereby measure jitter for each level of write power employed.

(4) The optical disk apparatus sets the write power, at which jitter becomes minimum, as optimum write power.

When data are overwritten by radiating a laser beam onto the optical disk, the optical disk apparatus superimposes erase power and write power on read power of the laser beam. The data that have already been recorded are erased with the erase power, which is applied before the write power. New data are recorded with subsequent write power. An optical disk of phase change type is taken as an example. A recording film is gently heated with the erase power and then gently cooled to change the recording film from an amorphous state to a crystalline state, thereby erasing data. The recording film is rapidly heated and cooled with the write power to change the recording film from the crystalline state to the amorphous state, thereby recording data. Write power optimum for overwriting operation is determined through the forgoing optimization steps, and the erase power is determined by multiplying the thus-optimized write power by a constant ratio.

However, in the optimization steps, there may arise a case where jitter of the overwritten test data varies according to the magnitude of an RF amplitude of the test data that have already been recorded even when the same write power is employed during overwriting operation. When comparison can be drawn between a case where the test data that have already been recorded have a large RF amplitude and a case where the test data have a small RF amplitude, greater erase and write power is required in the case where the test data have the large RF amplitude. For this reason, when the test data that have already been recorded have a large RF amplitude, jitter of the overwritten test data becomes deteriorated. Thus, the method—in which test data are overwritten by merely changing the write power in a plurality of levels and optimum write power is selected on the basis of the jitter of the overwritten test data—involves a problem of optimum write power not always being true optimum write power that can effect overwriting regardless of an RF amplitude of the data that have already been recorded.

In the optical disk such as DVD-RAM, the RF amplitude of data becomes saturated as the write power is increased, and no substantial change arises in jitter even when the write power is increased further. By utilization of this phenomenon, write power at which an RF amplitude becomes saturated is searched, and the thus-searched write power can be taken as optimum write power. However, in reality, a change in jitter has essentially disappeared before the RF amplitude becomes saturated. Consequently, the method for selecting write power at which the RF amplitude is saturated as optimum write power results in optimum write power being set so as to become higher than original optimum write power; that is, write power at which best jitter and a best error rate are achieved. Such high write power deteriorates durability, such as the number of rewriting operations. Consequently, even when write power at which an RF amplitude becomes saturated is merely searched and the thus-searched write power is set as optimum write power, the write power is effective for a certain number of writing operations. However, in view of durability, the method is not the best setting method.

SUMMARY OF THE INVENTION

The invention provides an optical disk apparatus which can record data at optimum write power at the time of recording of the data on an overwritable optical disk, thereby enhancing recording quality.

An optical disk apparatus of the invention has means for detecting first reproduced signal quality of test data obtained after test data recorded with write power lower than write power P of a laser beam have been overwritten with the write power P; means for detecting second reproduced signal quality of test data obtained after test data recorded with the write power higher than write power P have been overwritten with the write power P; and means for setting optimum write power on the basis of a difference between the first reproduced signal quality and the second reproduced signal quality. When a comparatively large difference exists between the first reproduced signal quality and the second reproduced signal quality, overwriting operation is susceptible to the influence of the RF amplitude of test data that have already been recorded. In contrast, when a comparatively small difference exists between the first reproduced signal quality and the second reproduced signal quality, the overwriting operation is not susceptible to any substantial influence of the RF amplitude of the test data that have already been recorded. Therefore, on the basis of a difference between the first reproduced signal quality and the second reproduced quality, the appropriateness of the write power P obtained at the time of overwriting operation can be evaluated. For instance, jitter or an error rate can be used as reproduced signal quality.

An optical disk apparatus of the invention has means for detecting first reproduced signal quality of test data obtained after test data recorded with write power lower than write power P of a laser beam have been overwritten with the write power P or second reproduced signal quality of test data obtained after test data recorded with write power higher than the write power P have been overwritten with the write power P; and means for setting optimum write power on the basis of the first reproduced signal quality or the second reproduced signal quality. When the value of reproduced signal quality or a rate of change in the value of reproduced signal quality to write power has become sufficiently small, the overwriting operation is not susceptible to any substantial influence of an RF amplitude of test data that have already been recorded. Consequently, the appropriateness of the write power P obtained at the time of overwriting operation can be appropriately evaluated by means of the value of reproduced signal quality or a rate of change.

The invention will be more clearly comprehended by reference to the embodiments provided below. However, the scope of the invention is not limited to those embodiments.

DETAILED DESCRIPTION OF THE EMBODIMENT OF THE INVETNION

The present invention will be described in detail hereinbelow by reference to the drawings.

Figure 1:
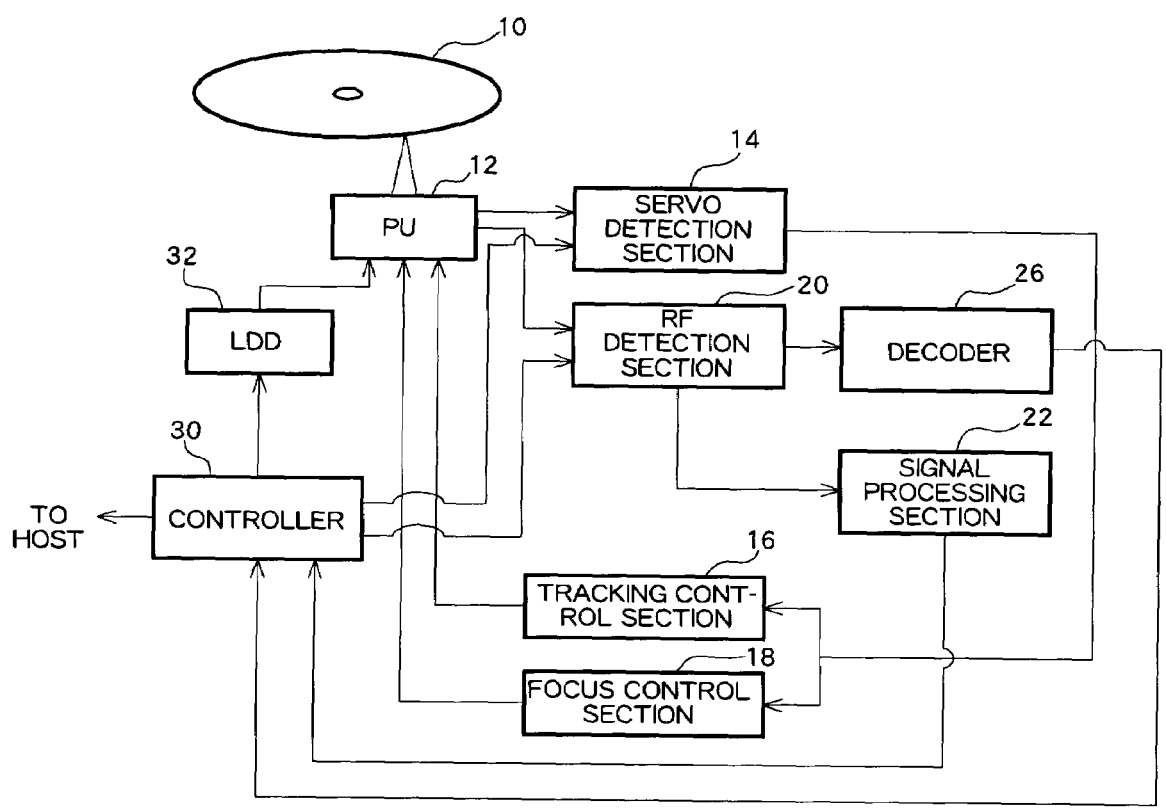
FIG. 1 is a block diagram showing the overall configuration of an optical disk apparatus.

FIG. 1 is a block diagram showing the overall configuration of an optical disk apparatus according to an embodiment. An optical pickup (PU) 12 is disposed so as to oppose an optical disk 10 and is configured so as to include a laser diode (LD) for radiating a laser beam onto the surface of the optical disk 10 and a photo detector (PD). The LD is activated by a laser diode drive circuit (LDD) 32. When data are reproduced from the optical disk 10, a laser beam of read power is output from the LD. When data are recorded on the optical disk 10, a laser beam having read power on which erase power and write power are superimposed is output from the LD. A rewritable optical disk, such as a DVD–RW, DVD+RW, DVD-RAM or the like, is used as the optical disk 10. The PD of the optical pickup 12 includes a PD for receiving a main beam in the same manner as a photo detector of known configuration using a differential push-pull method, and a PD for receiving two sub-beams. The PD outputs a detection signal corresponding to the quantity of light reflected from the optical disk 10 to a servo detection section 14 and an RF detection section 20.

On the basis of a signal output from the PD of the optical pickup 12, the servo detection section 14 produces a tracking error signal TE and a focus error signal FE and outputs the tracking error signal TE to a tracking control section 16 and the focus error signal FE to a focus control section 18. The tracking error signal TE is produced by the differential push-pull method; specifically, the tracking error signal TE is produced from a difference between a push-pull signal of the main beam and a push-pull signal of a sub-beam. The focus error signal FE is produced by an astigmatic method. The tracking error signal TE and the focus error signal FE may be computed by another method.

The tracking control section 16 actuates the optical pickup 12 in the widthwise direction of a track of the optical disk 10 on the basis of the tracking error signal TE, thereby maintaining a laser beam in an on-track state. The focus control section 18 actuates the optical pickup 12 in a focusing direction on the basis of the focus error signal FE, thereby maintaining the laser beam in an on-focus state.

The RF detection section 20 produces an RF signal by amplifying a signal output from the optical pickup 12; specifically, a sum signal output from the PD that receives reflective light of the main beam and outputs the RF signal to a signal processing section 22 and a decoder 26. The signal processing section 22 detects jitter from a reproduced signal of test data when OPC (Optimum Power Control) operation is performed and outputs the jitter to a controller 30. Here, the term OPC means processing for recording test data on a predetermined area (PCA) while write power is changed in a plurality of levels at the time of recording of data onto the data-recordable optical disk 10 and for detecting the quality of the recorded test data when the recorded test data are reproduced, thereby selecting optimum write power. The signal processing section 22 includes an equalizer, a binarizing circuit, a PLL circuit for producing a synchronizing clock signal, and a jitter detection circuit for detecting a phase shift between a binarized RF signal and the synchronizing clock signal. The signal processing section 22 supplies the detected jitter to the controller 30.

The controller 30 is made up of a microprocessor. On the basis of the detected jitter, the controller 30 determines optimum write power, to thereby control a laser diode drive circuit 32. Through the OPC operation, the controller 30 compares the jitter detected when test data are overwritten with write power higher than the write power used for recording the test data with the jitter detected when test data are overwritten with write power lower than the write power used for recording the test data. Optimum write power is decided by determining whether or not the two values of jitter differ from each other. The controller 30 determines whether or not certain write power is optimum, by determining whether or not a difference exists between the jitter obtained as a result of test data having been overwritten with write power lower than the certain write power and the jitter obtained as a result of test data having been overwritten with write power higher than the certain write power. Such a determination to be performed by the controller 30 is based on a fact that the RF amplitude of the test data becomes saturated in the vicinity of optimum write power and no substantial change arises in jitter. The erase power is determined in a predetermined proportion with regard to the thus-optimized write power.

The decoder 26 has the equalizer and the binarizer. The decoder 26 boosts a predetermined frequency of the reproduced RF signal; specifically, the amplitude of a 3T signal, thereby producing a binarized signal. The thus-binarized signal is demodulated, and the demodulated signal is output to the controller 30. Demodulation is performed by producing a synchronizing clock signal in the PLL circuit and extracting the clock signal. The signal processing section 22 includes the equalizer, the binarizer, and the PLL circuit. Hence, the decoder 26 may receive and demodulate the binarized signal and the synchronizing clock signal, both produced by the signal processing section 22. FIG. 1 shows the signal processing section 22 and the decoder 26 separately from each other. The signal processing section 22 may have a decoding function, and the decoder 26 may be provided in a stage subsequent to the signal processing section 22.

The controller 30 performs control operation such that the laser beam output from the LD as a result of driving of an LDD 32 assumes optimized write power. Further, the controller 30 outputs the demodulated data output from the decoder 26 to a host computer or the like.

At the time of recording of data, data to be recorded are supplied from the host computer to an encoder. The encoder encodes the data; converts the data into a pulse according to a predetermined write strategy; and outputs the pulse to the LDD 32. When the optical disk 10 is a DVD, the data are converted into a multi-pulse. The write strategy has been stored in advance in ROM of the controller 30 and may be optimized when the OPC operation is performed. The encoder can be formed integrally with the decoder 26.

Figure 2:
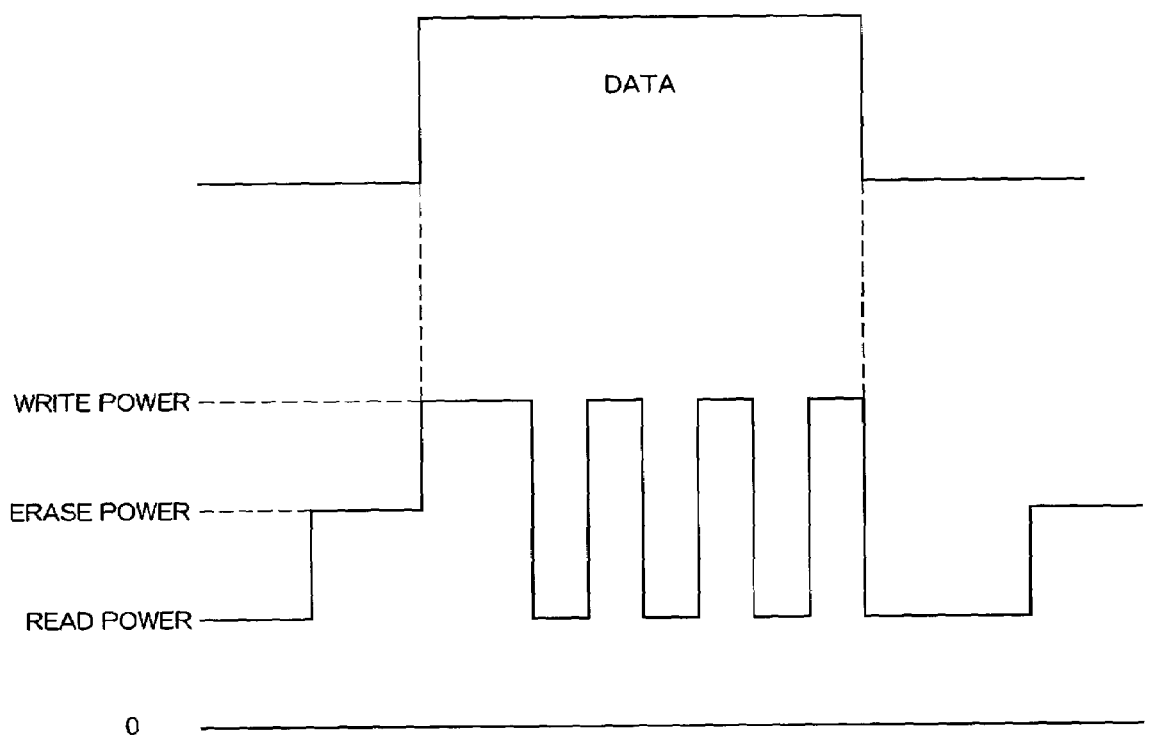
FIG. 2 is a descriptive view of data to be recorded and a multi-pulse.

FIG. 2 shows example data to be recorded and an example multi-pulse corresponding to the data. The multi-pulse is formed from a leading pulse and a group of subsequent pulses. The multi-pulse increases from read power to erase power and then further up to write power. The data that have already been recorded are erased with a portion of the power corresponding to the erase power, and new data are recorded with a portion of the power corresponding to the write power. The controller 30 optimizes the write power shown in FIG. 2.

Figure 3:
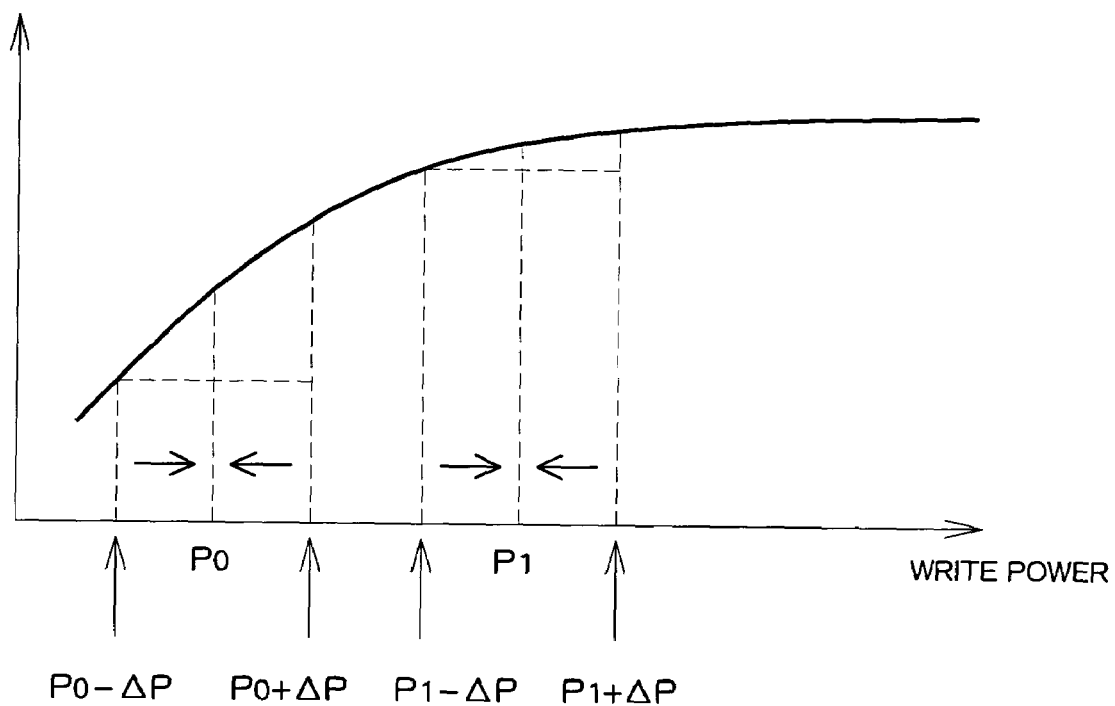
FIG. 3 is a graph showing a relationship between write power and an RF amplitude.

FIG. 3 shows s variation in a reproduced RF amplitude of the test data that have been recorded while the write power was changed through OPC operation. The RF amplitude increases with an increase in write power. When the write power has reached a certain level, the RF amplitude becomes saturated. Consideration will now be given of two cases: that is, a case where test data are recorded with write power $P0-\Delta P$ lower than certain write power P0 and then test data are overwritten with the write power P0, and a case where test data are recorded with write power $P0+\Delta P$ higher than the certain write power P0 and then test data are overwritten with the write power P0. When test data are overwritten by changing the write power ($P0-\Delta P$) to the write power P0, the RF amplitude of the test data that have already been recorded is relatively low. Hence, the test data can be readily erased and recorded, thereby improving jitter. In contrast, when test data are overwritten by changing the write power ($P0+\Delta P$) to the write power P0, difficulty is encountered in erasing and recording the test data, because the RF amplitude of the test data that have already been recorded is large, thus deteriorating jitter. Therefore, a difference between the two values of jitter becomes greater.

Consideration is now given of a case where test data are overwritten in the same manner through use of write power P1 which is higher than the write power P0 and is taken as a reference. Specifically, there is made a comparison between a case where test data are overwritten with write power P1 after having been recorded with write power ($P1-\Delta P$) lower than the write power P1 and a case where test data are overwritten with the write power P1 after having been recorded with write power ($P1+\Delta P$) higher than the write power P1. When no substantial change arises in the RF amplitude of the test data recorded with these types of write power, a difference between two values of jitter also becomes small.

As mentioned above, there is computed a difference between the jitter obtained as a result of test data being overwritten after having been recorded with relatively lower write power and the jitter obtained as a result of test data being overwritten after having been recorded with relatively higher write power. By determining the magnitude of the difference, a determination can be made as to whether or not the jitter has become saturated when test data are overwritten with the write power.

Figure 4:
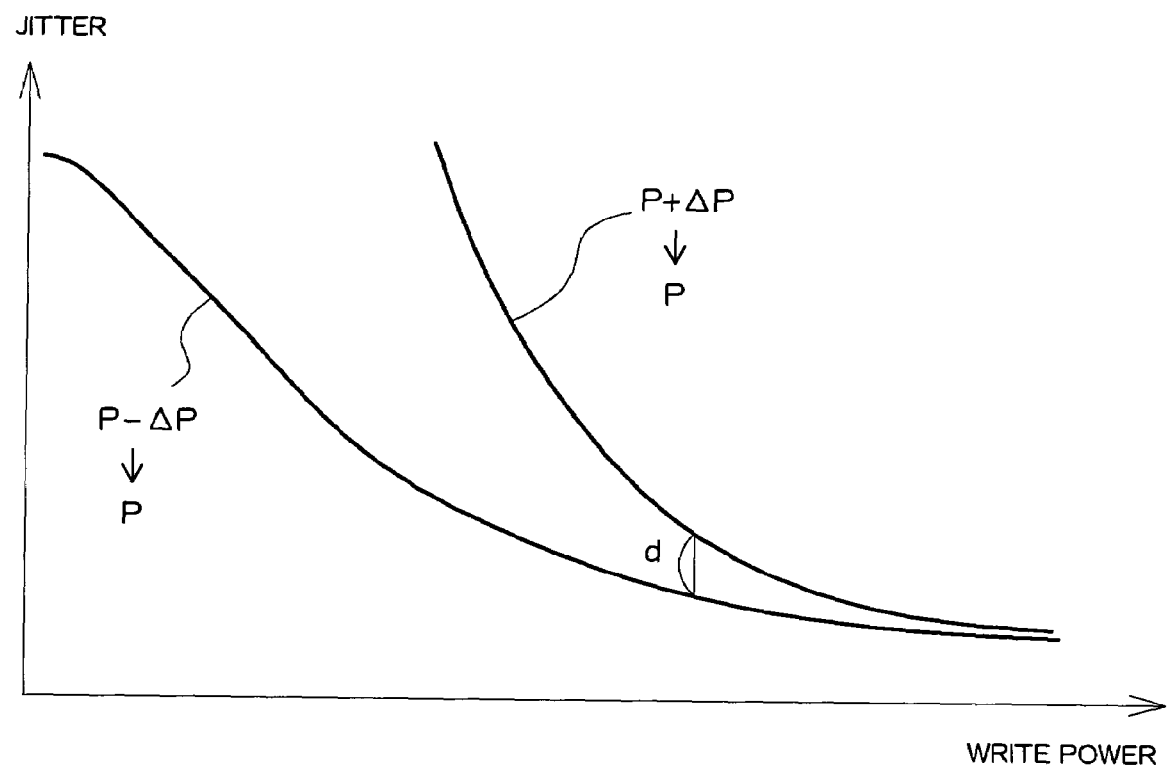
FIG. 4 is a graph showing a relationship between write power and jitter obtained at the time of overwriting operation.

A relationship between the write power and a change in jitter will further be described. FIG. 4 shows a relationship between write power and jitter obtained when test data are first recorded with write power ($P-\Delta P$) and then overwritten with write power P being changed, and a relationship between write power and jitter obtained when test data are first recorded with write power ($P+\Delta P$) and then overwritten with the write power P being changed.

The jitter obtained when test data are overwritten with the write power being changed from $P+\Delta P$ to P becomes particularly large when the write power P is small. As the write power P increases, the jitter becomes smaller. When the write power P is further increased, the jitter becomes close to the jitter obtained when test data are overwritten with the write power being changed from ($P-\Delta P$) to P. When a difference between two values of jitter obtained through two overwriting operations is taken as "d," the difference "d" changes with the write power and becomes smaller with an increase in write power. When a comparison between the difference "d" and a predetermined threshold value shows that the difference "d" has dropped to a value lower than or equal to the predetermined threshold value, the jitter can be determined to have become saturated. The write power P at which jitter becomes saturated can be set to optimum write power. In the above-described processing, attention must be paid to the fact that power at which jitter becomes saturated is selected instead of power at which a mere RF amplitude is saturated.

Figure 5:
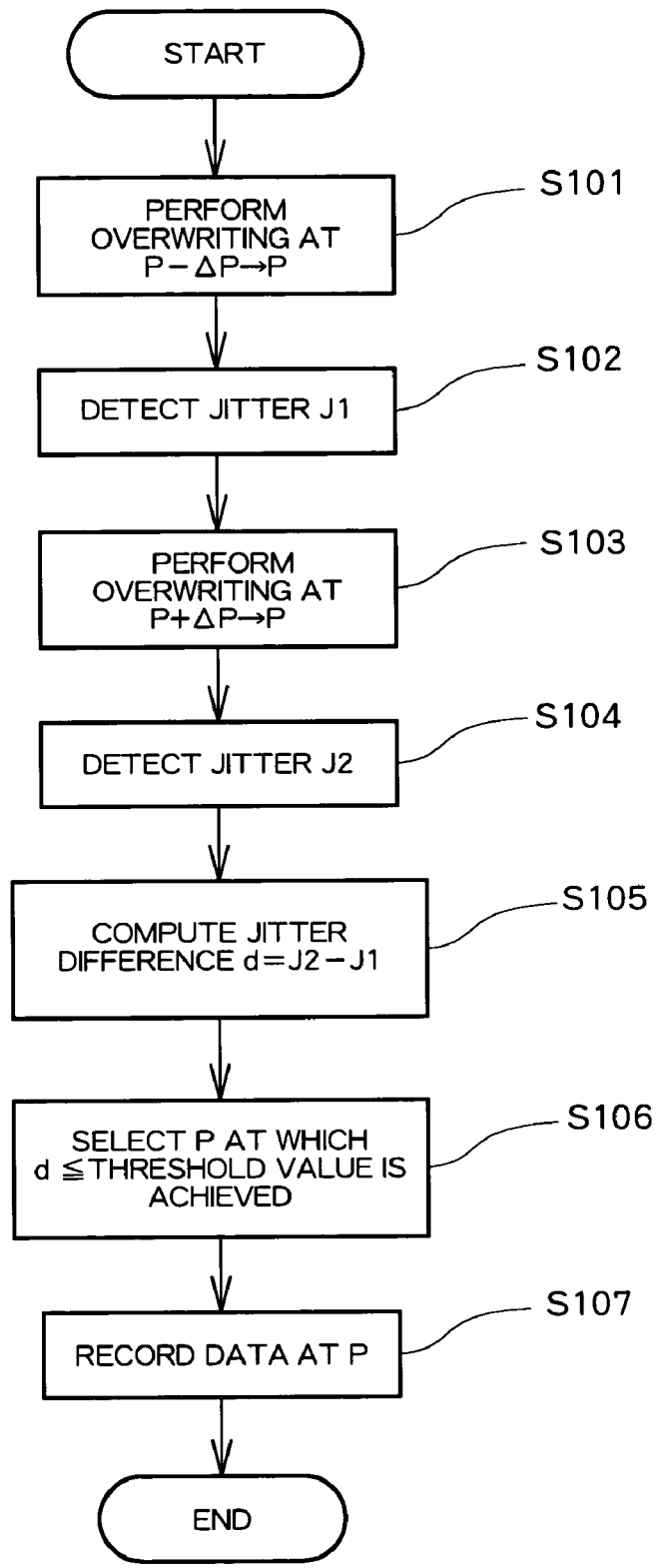
FIG. 5 is a basic processing flowchart according to an embodiment.

FIG. 5 shows a basic processing flowchart for computing optimum write power in the embodiment. First, the controller 30 records test data on the optical disk 10 with write power ($P-\Delta P$) lower than certain write power P. Test data are overwritten with the power P (S101). ΔP may be set to a value of, e.g., 1.0 mW or thereabouts. After test data have been overwritten, the controller 30 reproduces the overwritten test data, thereby detecting jitter J1 (S102).

Next, the controller 30 records the test data with write power ($P+\Delta P$) higher than the write power P. thereby overwriting test data with write power P (S103). Reproduced jitter J2 of the overwritten test data is detected (S104).

After the jitter J1 obtained when test data are overwritten while the write power ($P-\Delta P$) is changed to P and the jitter J2 obtained when test data are overwritten while the write power ($P+\Delta P$) is changed to P have been detected, the controller 30 computes a difference "d" between the values of jitter; that is, "d"=J2−J1 (S105). In general, $J2 \geq J1$, and hence $d \geq 0$. controller 30 repeatedly performs the above-described processing operations for a plurality of levels of write power P. A jitter difference "d" is computed for each write power P. The jitter difference "d" is dependent on the write power P, and hence the jitter difference "d" is labeled d(P). After a jitter difference d(P) has been computed for a plurality of levels of write power P, the jitter difference d(P) is compared with the predetermined threshold value. Thus, the write power P that yields a jitter difference d(P) which becomes lower than or equal to the predetermined threshold value is selected (S106). The threshold value may be set to a value of, e.g., 2%. A recording characteristic can be changed for each optical disk 10. Hence, setting a threshold value for each optical disk 10 is also preferable.

The jitter difference d(P) becomes smaller as the write power P increases. When the jitter difference d(P) has becomes lower than or equal to the threshold value at certain write power P, the jitter difference d(P) becomes lower than the threshold value at write power higher than the certain write power P. Therefore, although a plurality of levels of write power can be selected in step S106, the controller 30 can select the minimum write power from the levels of write power P at which the jitter difference d(P) becomes lower than or equal to the threshold value. The reason why the minimum write power is selected is that the number of times data can be rewritten decreases with an increase in the write power P. As a result of the minimum write power being selected, as optimum write power, from among the levels of write power at which the difference d(P) becomes lower than or equal to the threshold value, optimum write power which is superior in jitter and durability can be selected. After the optimum write power has been determined, data to be recorded are recorded in a data area of the optical disk 10 with the optimum write power (S107).

Figure 6:
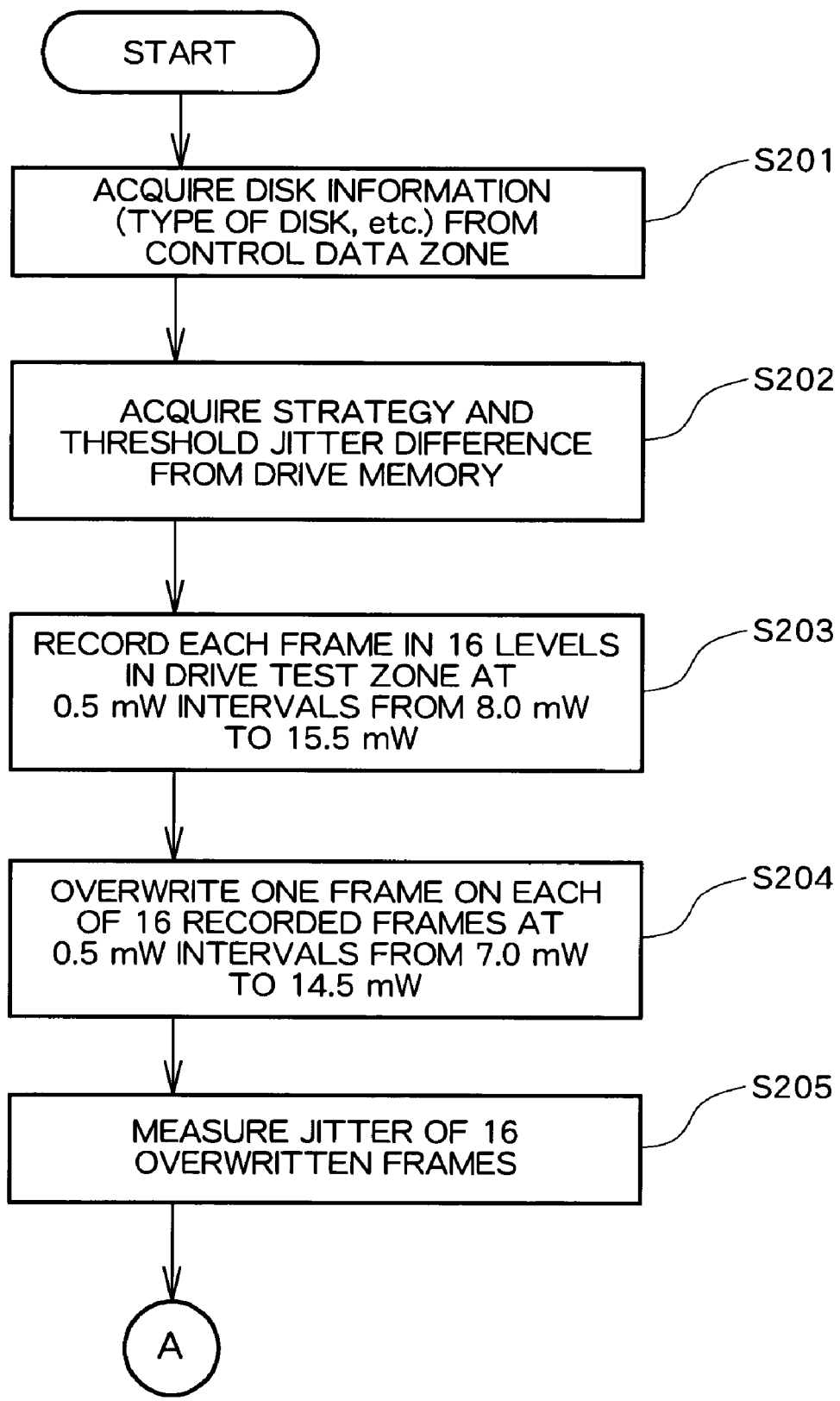
FIG. 6 is a detailed flowchart (part 1) of the embodiment.
Figure 7:
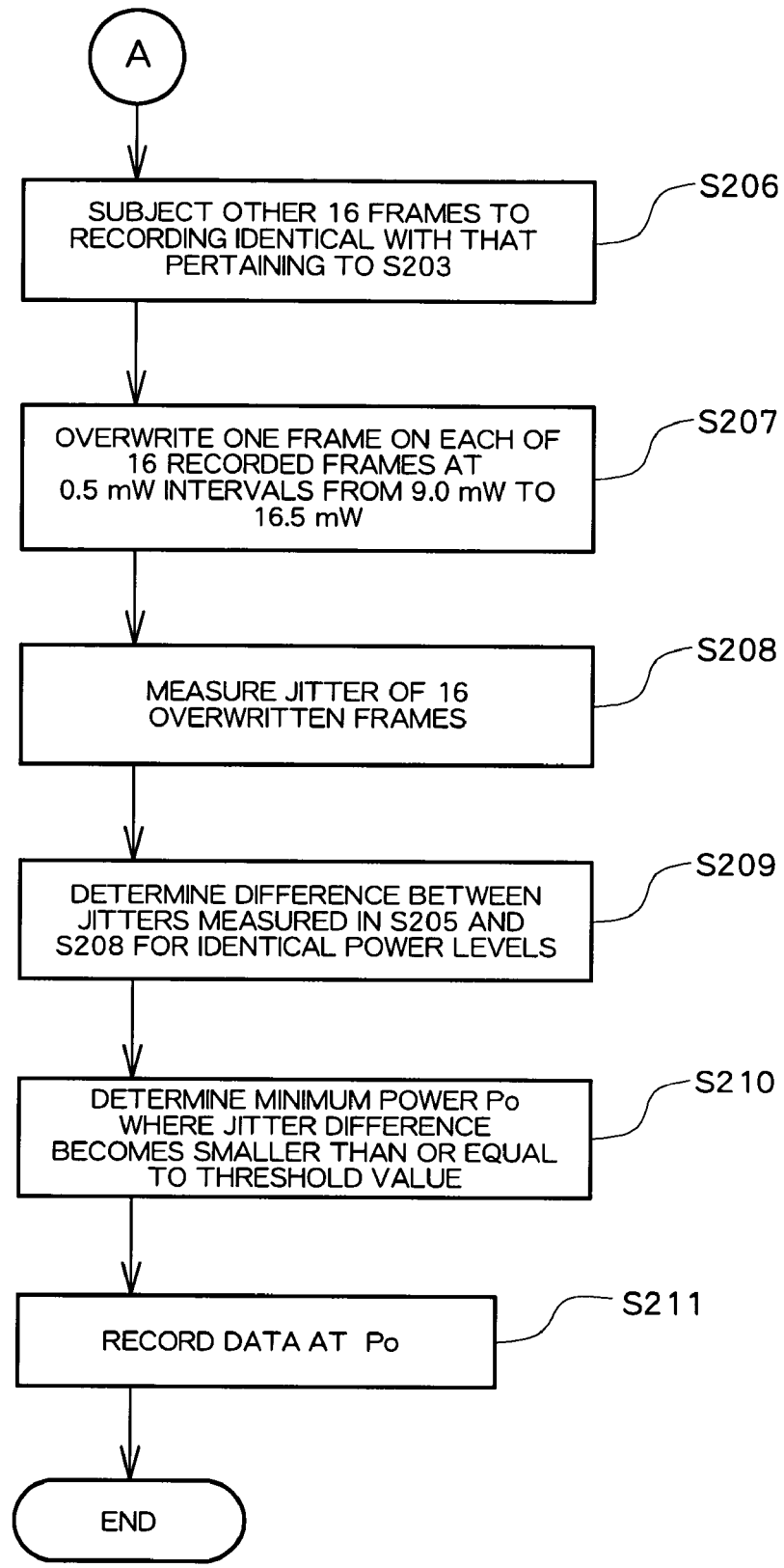
FIG. 7 is a detailed flowchart (part 2) of the embodiment.

FIGS. 6 and 7 show detailed flowcharts. First, the controller 30 acquires disk information, such as a type of a disk (e.g., the kind of manufacturer) from a control data zone of the optical disk 10 (S201). Specifically, a laser beam of read power is irradiated onto the optical disk 10, to thereby read data from the control data zone and acquire disk information. The controller 30 acquires a write strategy and a jitter difference threshold value from memory of the controller 30 in accordance with the thus-acquired disk information (S202). Write strategies and jitter difference threshold values, which are to be used according to the type of a disk or a manufacturer, are stored before hand in the memory provided in the controller 30. The strategy and the threshold value that correspond to the kind of the disk (e.g., the kind of a manufacturer) read in step S201 are acquired and set. A write strategy and a threshold value are written into the control data zone of the optical disk 10, and the controller 30 may read and set the write strategy and the threshold value. Although the kind of memory is arbitrary, flash ROM, for example, can be used.

Next, the controller 30 records the test data over a total of 16 frames in the test area (PCA) of the optical disk 10 by changing the write power in 16 levels on a per-frame basis at 0.5 mW intervals from 8.0 mW to 15.5 mW (S203). The test data can be taken as a data sequence at which data of 3T to 14T lengths (T designates a reference time length) randomly appear. The controller 30 overwrites the test data on the recorded 16 frames on a per-frame basis by changing the write power at 0.5 mW intervals from 7.0 mW to 14.5 mW (S204). Specifically, the test data recorded at 8.0 mW are overwritten with 7.0 mW, and the test data recorded at 8.5 mW are overwritten with 7.5 mW. Likewise, test data are sequentially overwritten with write power lower than that used for recording the test data by 1.0 mW.

After the test data have been overwritten with the write power lower than that used for recording the test data by 1.0 mW, the controller 30 reproduces the overwritten test data, thereby detecting jitter on a per-frame basis (S205). As a result, a total of 16 values of jitter are obtained for each level of write power. Hence, sixteen values of jitter are stored in the memory of the controller 30 for each level of write power.

For example, 8.0 mW to 7.0 mW: Jitter A 8.5 mW to 7.5 mW: Jitter B 9.0 mW to 8.0 mW: Jitter C 10.0 mW to 9.0 mW: Jitter E.

As shown in FIG. 7, the controller 30 again records the test data over a total of 16 frames on a per-frame basis by changing the write power at 0.5 mW intervals from 8.0 mW to 15.5 mW as in the case of S203 (S206). After the test data have been recorded over the 16 frames, the controller 30 overwrites test data on the 16 frames on a per-frame basis by changing the write power at 0.5 mW intervals from 9.0 mW to 16.5 mW (S207). Specifically, the test data recorded at 8.0 mW are overwritten with 9.0 mW, and the test data recorded at 8.5 mW are overwritten with 9.5 mW. Likewise, test data are overwritten at write power which is higher by 1.0 mW than that used for recording the test data. After the test data have been overwritten at write power which is higher by 1.0 mW than that used for recording the test data, jitter is detected for each frame after overwriting of test data (S208). The jitter thus detected for each level of power is stored in the memory of the controller 30. For example, 8.0 mW to 9.0 mW: Jitter α

8.5 mW to 9.5 mW: Jitter β

9.0 mW to 10.0 mW: Jitter γ.

After storage of the jitter obtained when test data are overwritten with the write power that is lower than that used for recording the data by 1.0 mW and the jitter obtained when test data are overwritten with the write power that is higher than that used for recording the data by 1.0 mW, for each power level the controller 30 compares the sixteen values of jitter with each other, thus computing a difference (S209). For instance, when attention is paid to a power level of 9.0 mW, jitter α obtained when the test data recorded at 8.0 mW are overwritten with 9.0 mW and jitter E obtained when the test data recorded at 10.0 mW are overwritten with 9.0 mW are read from the memory, and a jitter difference "d"=E−α is computed. After computation of the jitter difference "d" for each write power level, the controller 30 determines the minimum power Po from among the write power levels at which the jitter difference "d" is lower than the threshold value set in step S202 (S210). The write power Po is set as optimum write power, and data are recorded in a data area of the optical disk 10 with optimum write power Po (S211). Specifically, the controller 30 records data on the optical disk 10 of non-recorded state with the optimum write power Po and also overwrites test data. Although the erase power is set in a predetermined proportion with regard to the thus-optimized write power, the erase power that has been set first may also be maintained.

As mentioned above, optimum write power which is superior in jitter and durability can be selected. In the embodiment, the minimum write power level from among the write power levels at which the jitter difference becomes smaller than or equal to the predetermined threshold value is selected as the optimum write power Po. However, in view of a special emphasis on durability, c•Po—which is determined by multiplying the thus-selected Po by a predetermined coefficient "c" (e.g., 0.95) smaller than 1—may be set as optimum write power. The coefficient "c" must be sufficiently close to one. If the coefficient "c" is excessively smaller than one, optimization of the write power by reference to jitter will become meaningless.

Although the embodiment uses jitter as signal quality of test data after overwriting operation, an error rate maybe used in place of jitter. If the error rate is used, an error rate is supplied to the controller 30 from an error correction circuit provided in a stage subsequent to the decoder 26. The controller 30 computes an error rate difference for each power level, and the minimum write power level from among the write power levels at which the error rate difference becomes smaller than or equal to the predetermined threshold value is set as the optimum write power Po.

The embodiment employs the following processing: first recording of test data→first overwriting of test data→first measurement of jitter→second recording of test data→second overwriting of test data→second measurement of jitter→computation of jitter difference→selection of optimum write power. Test data can be collectively recorded in the PCA of the optical disk 10. Test data can be collectively overwritten, to thereby simplify the processing.

Figure 8:
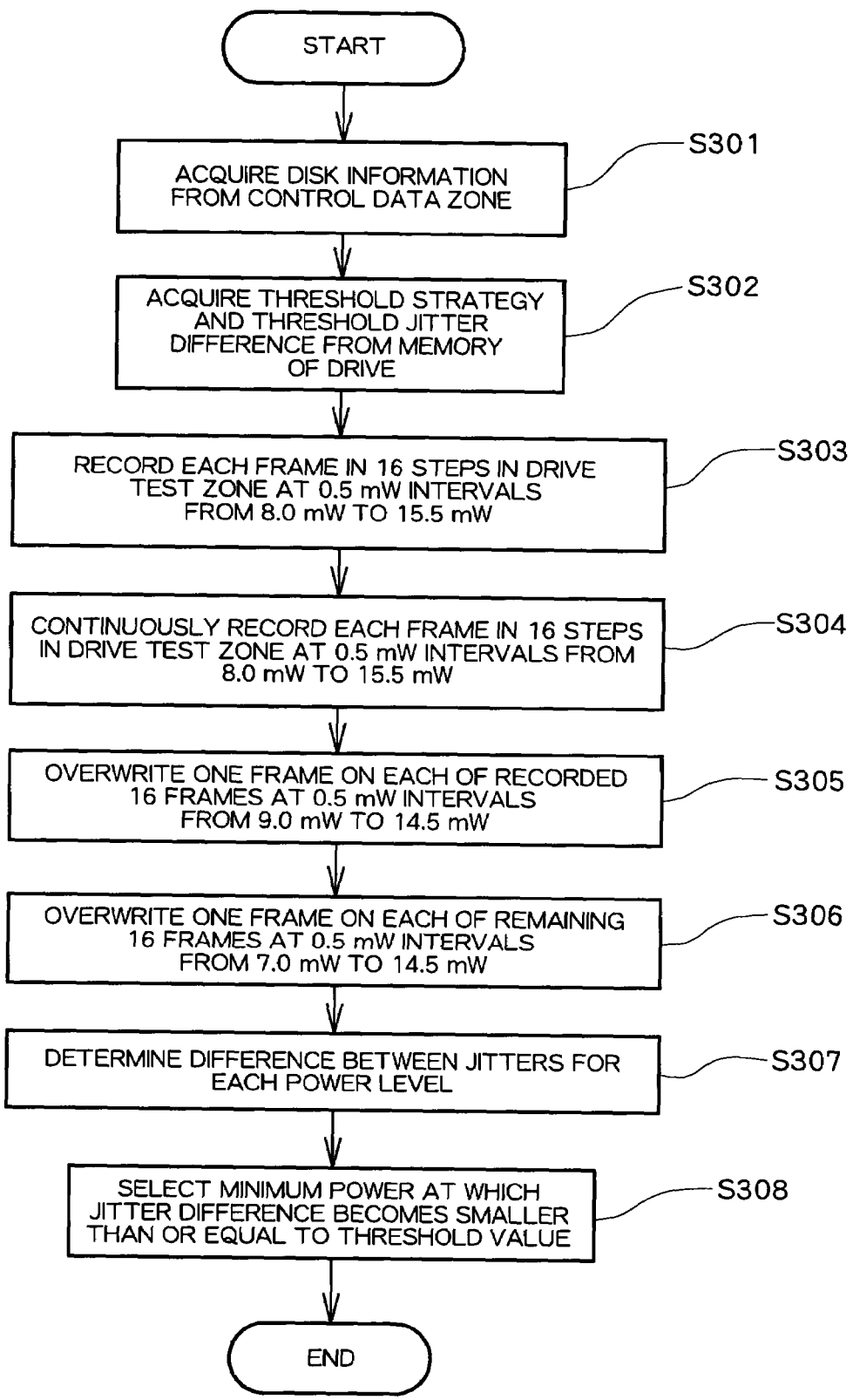
FIG. 8 is another detailed flowchart of the embodiment.

FIG. 8 shows a processing flowchart for this case. First, the controller 30 acquires disk information from the control data zone of the optical disk 10, such as DVD-RAM (S301), and then acquires a write strategy and a threshold value according to the type of a disk (S302) For example, in the case of DVD-RAM of a manufacturer A, a threshold value is set to 2%; and, in the case of DVD-RAM of a manufacturer B, a threshold value is set to 3%.

The controller 30 records test data in the PCA of the optical disk 10 over 16 frames by changing the write power on a per-frame basis at 0.5 mW intervals from 8.0 mW to 15.5 mW (S303). The erase power is set in a predetermined proportion with regard to the thus-optimized write power. The controller 30 records test data in 16 frames by changing the power on a per-frame basis at 0.5 mW intervals from 8.0 mW to 15.5 mW (S304). Therefore, the test data are collectively recorded over a total of 32 frames by changing the write power.

After recording of the test data, the controller 30 overwrites test data in the first 16 frames by changing the write power at 0.5 mW intervals from 9.0 mW to 16.5 mW (S305). As a result, in a certain frame, the test data recorded at 9.0 mW are overwritten at 10.0 mW. In another frame, the test data recorded at 11.0 mW are overwritten at 12.0 mW. Next, test data are overwritten on the remaining 16 frames by changing the write power at 0.5 mW intervals from 7.0 mW to 14.5 mW (S306). As a result, in a certain frame, the test data recorded at 9.0 mW are overwritten with 8.0 mW. In another frame, the test data recorded at 11.0 mW are overwritten with 10.0 mW.

The controller 30 reproduces the test data corresponding to the total of 32 frames after overwriting operation, thereby detecting jitter for each frame and storing the thus-detected values of jitter into the memory of the controller 30. For each power level, the controller 30 computes a jitter difference "d" from the value of jitter for each frame (S307). From among levels of write power at which the jitter difference "d" is smaller than or equal to the threshold value, the minimum write power is set as the optimum write power Po (S308).

The foregoing processing involves: recording of test data→overwriting of test data→measurement of jitter→computation of jitter difference→selection of optimum write power. Hence, processing is facilitated. In connection with the processing shown in FIG. 8, an error rate may be used in place of jitter.

Although thus far the invention has been described by reference to the embodiment, the invention is not limited to the embodiment and is susceptible to various modifications.

In the embodiment, there is computed a difference between jitter of test data obtained by overwriting, with the write power P, the test data recorded at write power lower than the write power P and jitter of test data obtained by overwriting, with write power P, the test data recorded at write power higher than the write power P. The write power P at which the difference becomes sufficiently smaller to a level lower than or equal to the threshold value is set as optimum write power. However, as can be seen from FIG. 4, when jitter of test data obtained as a result of the test data being overwritten while the write power is changed from (P−ΔP) to P is sufficiently small, the jitter difference d(P) also becomes small. Consequently, only jitter of test data obtained as a result of the test data being overwritten while the write power is changed from (P−ΔP) to P or jitter of test data obtained as a result of the test data being overwritten while the write power is changed from P to (P−ΔP) is compared with a threshold value. Of the write power levels at which either value of jitter becomes lower than or equal to the threshold value, the minimum write power level may be set to optimum write power. Alternatively, the rate of change in jitter with respect to the write power P obtained when test data are overwritten while the write power is changed from (P−ΔP) to P or the rate of change in jitter with respect to the write power P obtained when test data are overwritten while the write power is changed from P to (P−ΔP) is compared with a threshold value. Of the write power levels at which the rate of change becomes lower than or equal to the threshold value, the minimum write power may be set to the optimum write power.

What is claimed is:

1. An optical disk apparatus for recording data on an optical disk, comprising:
   means for detecting first reproduced signal quality of test data obtained after test data recorded with write power lower than write power P of a laser beam have been overwritten with said write power P;
   means for detecting second reproduced signal quality of test data obtained after test data recorded with write power higher than said write power P have been overwritten with said write power P; and
   means for setting optimum write power on the basis of a difference between said first reproduced signal quality and said second reproduced signal quality.

2. The apparatus according to claim 1, wherein said first and second reproduced signal qualities are jitter or an error rate.

3. The apparatus according to claim 1, wherein said setting means sets, as optimum write power, write power P at which a difference between said first reproduced signal quality and said second reproduced signal quality is smaller than or equal to a threshold value.

4. The apparatus according to claim 3, further comprising:
   means for storing said threshold value for each type of said optical disk, wherein
   said setting means determines the type of said optical disk and sets optimum write power through use of said threshold value corresponding to the type of said optical disk.

5. The apparatus according to claim 1, wherein said setting means sets, as said optimum write power, a minimum write power level from among write power levels P at which said difference between said first reproduced signal quality and said second reproduced signal quality is smaller than or equal to a predetermined threshold value.

6. The apparatus according to claim 1, wherein said setting means sets, as optimum write power, a value determined by multiplying a minimum write power level from among write power levels P at which said difference between said first reproduced signal quality and said second reproduced signal quality is smaller than or equal to a predetermined threshold value, by a constant smaller one.

7. The apparatus according to claim 1, wherein said overwriting operation is performed by means of a laser beam pulse which changes from read power to said write power by way of erase power.

8. An optical disk apparatus for recording data on an optical disk, comprising:
   means for recording test data in a predetermined area of said optical disk while write power is changed among a plurality of levels;
   first overwrite means for overwriting said test data while write power is changed among a plurality of levels so as to become lower than write power used for recording operation;
   second overwrite means for overwriting said test data while write power is changed among a plurality of levels so as to become higher than write power used for recording operation;

means for detecting, for each write power level, a difference between jitter or an error rate of test data overwritten by said first overwrite means and jitter or an error rate of test data overwritten by said second overwrite means; and means for selecting write power at which said difference detected for each write power level is smaller than or equal to a predetermined threshold value and setting said selected write power as optimum write power at the time of recording of data.

9. An optical disk apparatus for recording data on an optical disk, comprising:

an optical pickup which records test data in a test area of said optical disk while write power is changed among a plurality of levels, subjects said test data to first overwriting while write power is changed among a plurality of levels so as to become lower than write power used for recording said test data, and subjects said test data to second overwriting while write power is changed among a plurality of levels so as to become higher than said write power used for recording said test data;

a signal processing circuit for detecting, for each write power, jitter or an error rate of said test data that have been subjected to said first overwriting, and jitter or an error rate of said test data that have been subjected to said second overwriting; and a controller which computes a jitter or error rate difference between said first overwritten test data and said second overwritten test data for each said write power, selects write power at which said jitter or error rate difference is smaller than or equal to a threshold value set according to said optical disk, and sets said selected write power as optimum write power, wherein said controller computes erase power on the basis of said optimum write power, and said optical pickup records data in a data area of said optical disk through use of said erase power and said optimum record power under control of said controller.

* * * * *